United States Patent
Lee

(10) Patent No.: US 8,595,848 B2
(45) Date of Patent: *Nov. 26, 2013

(54) METHOD FOR MOVING RIGHTS OBJECT AND METHOD FOR MANAGING RIGHTS OF ISSUING RIGHTS OBJECT AND SYSTEM THEREOF

(75) Inventor: Seung-Jae Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 125 days.

This patent is subject to a terminal disclaimer.

(21) Appl. No.: 12/717,760

(22) Filed: Mar. 4, 2010

(65) Prior Publication Data

US 2010/0162409 A1    Jun. 24, 2010

Related U.S. Application Data

(63) Continuation of application No. 12/332,983, filed on Dec. 11, 2008.

(30) Foreign Application Priority Data

Dec. 14, 2007  (KR) .................. 10-2007-0131437
May 15, 2008  (KR) .................. 10-2008-0045208

(51) Int. Cl.
    *H04L 29/06*     (2006.01)
(52) U.S. Cl.
    USPC ................................. 726/26; 726/6
(58) Field of Classification Search
    USPC .................................. 726/6, 26
    See application file for complete search history.

(56) References Cited

U.S. PATENT DOCUMENTS

| | | | |
|---|---|---|---|
| 6,330,670 B1 | 12/2001 | England et al. | |
| 6,907,407 B1 | 6/2005 | Yamanoue et al. | |
| 6,959,289 B1 | 10/2005 | James et al. | |
| 6,999,948 B1 | 2/2006 | Hatanaka et al. | |
| 8,205,071 B2 * | 6/2012 | Lee | 713/150 |
| 8,391,497 B2 * | 3/2013 | Zhang et al. | 380/282 |
| 2003/0046347 A1 * | 3/2003 | Nishimura | 709/206 |
| 2003/0048907 A1 | 3/2003 | Nakahara et al. | |
| 2003/0076955 A1 | 4/2003 | Alve et al. | |
| 2004/0078338 A1 | 4/2004 | Ohta et al. | |

(Continued)

FOREIGN PATENT DOCUMENTS

| | | |
|---|---|---|
| CN | 1423225 A | 6/2003 |
| CN | 1829996 A | 9/2006 |

(Continued)

OTHER PUBLICATIONS

"DRM Specification—SCE Extensions," Canidate Version 1.0, Dec. 9, 2008, Open Mobile Alliance, OMA-TS-SCE_DRM-V1_0. 20081209-C, pp. 1-59.

(Continued)

*Primary Examiner* — David García Cervetti
(74) *Attorney, Agent, or Firm* — Birch, Stewart, Kolasch & Birch, LLP

(57) ABSTRACT

A method for managing rights of issuing a Rights Object (RO), and a method for moving an RO created by a Local Rights Manager (LRM) between Digital Rights Management (DRM) Agents, are discussed. A Right Issuer (RI) permits an LRM to move an RO created (or issued) by the LRM to move via the RI, and a first DRM Agent moves the RO to a second DRM Agent via the RI.

21 Claims, 5 Drawing Sheets

(56) References Cited

U.S. PATENT DOCUMENTS

| | | |
|---|---|---|
| 2004/0158712 A1 | 8/2004 | Lee et al. |
| 2005/0044391 A1 | 2/2005 | Noguchi et al. |
| 2005/0216763 A1 | 9/2005 | Lee et al. |
| 2006/0059105 A1 | 3/2006 | Ebihara et al. |
| 2006/0153212 A1 | 7/2006 | Kawaguchi et al. |
| 2007/0100701 A1 | 5/2007 | Boccon-Gibod et al. |
| 2007/0112681 A1 | 5/2007 | Niwano et al. |
| 2007/0288387 A1* | 12/2007 | Park et al. ............ 705/59 |
| 2008/0046271 A1* | 2/2008 | Jeong et al. ............ 705/1 |
| 2008/0047006 A1* | 2/2008 | Jeong et al. ............ 726/21 |
| 2008/0114687 A1* | 5/2008 | Watanabe et al. ........ 705/51 |
| 2008/0163377 A1* | 7/2008 | Lee et al. ............. 726/26 |
| 2009/0165143 A1* | 6/2009 | Lee ................... 726/26 |
| 2009/0265556 A1* | 10/2009 | Lee .................. 713/169 |
| 2010/0017888 A1* | 1/2010 | Zhang et al. .......... 726/26 |
| 2010/0138645 A1* | 6/2010 | Lee .................. 713/150 |
| 2010/0162409 A1* | 6/2010 | Lee ................... 726/26 |
| 2010/0215181 A1* | 8/2010 | Zhang et al. ......... 380/282 |
| 2010/0306548 A1* | 12/2010 | Kravitz .............. 713/182 |
| 2011/0007898 A1* | 1/2011 | Meyer et al. ......... 380/255 |
| 2011/0083189 A1* | 4/2011 | Kravitz .............. 726/26 |
| 2013/0124864 A1* | 5/2013 | Zhang et al. ......... 713/168 |

FOREIGN PATENT DOCUMENTS

| | | |
|---|---|---|
| CN | 1902560 A | 1/2007 |
| CN | 101046839 A | 10/2007 |
| EP | 1316900 A2 | 6/2003 |
| EP | 1416406 A1 | 5/2004 |
| EP | 1 892 924 A2 | 2/2008 |
| KR | 10-2007-0040322 A | 4/2007 |
| KR | 10-2007-0100079 A | 10/2007 |
| WO | WO 2005/066874 A2 | 7/2005 |
| WO | WO 2007/021108 A1 | 2/2007 |

OTHER PUBLICATIONS

"DRM Specification V2.0," Draft Verison 2.0, Apr. 20, 2004, Open Mobile Alliance, OMA-DRM-DRM-V2_0-20040420-D, pp. 1-145.

"Local Rights Manager for Secure Content Exchange," Candidate Version 1.0, Dec. 9, 2008, Open Mobile Alliance, OMA-TS-SCE_LRM-V1_0-20081209-C, pp. 1-56.

"Secure Content Exchange Architecture," Draft Version 1.0, Sep. 18, 2008, Open Mobile Alliance, OMA-AD-SCE-V0_9_20080918-D, pp. 1-31.

* cited by examiner

METHOD FOR MOVING RIGHTS OBJECT AND METHOD FOR MANAGING RIGHTS OF ISSUING RIGHTS OBJECT AND SYSTEM THEREOF

This application is a Continuation of co-pending application Ser. No. 12/332,983 filed on Dec. 11, 2008, and for which priority is claimed under 35 U.S.C. §120; and this application claims priority of Application Nos. 10-2007-0131437 and 10-2008-0045208 filed in Korea on Dec. 14, 2007 and May 15, 2008 respectively under 35 U.S.C. §119; the entire contents of all are hereby incorporated by reference.

TECHNICAL FIELD

The present invention relates to a Digital Rights Management (DRM), and more particularly, to a method for moving a Rights Object (RO), a method for managing rights of issuing an RO, and a system thereof.

BACKGROUND ART

Generally, a Digital Rights agent (DRM) is technique to protect a rights object (RO) for digital contents and systematically manage it, and provides a protecting and managing scheme for preventing an illegal copy of the contents, obtaining the RO, creating/moving the contents, and consuming the RO and the contents. The DRM is applied to various applications such as a media player, an audio player, or an image viewer.

FIG. 1 is a configuration view showing a DRM system in accordance with the related art. As shown, the DRM system controls contents issued to a user by a content provider to be consumed only in a right-limit of RO. The content provider is an entity corresponding to a Contents Issuer (CI) or a Rights Issuer (RI).

The CI issues contents protected by a specific encryption method (hereinafter, will be referred to as DRM contents) so as to protect contents from a user having no access right, and the RI issues a Rights Object (RO) necessary to consume the DRM contents.

A DRM agent is mounted at a device thus to receive the DRM contents and ROs from the CI or the RI, and controls consumption of the DRM contents by analyzing a 'License' contained in the RO, and by converting the DRM contents to contents that can be consumed at a corresponding DRM Agent.

FIG. 2 is a block diagram showing a state that a Rights Object (RO) is moved between DRM Agents via an Right Issuer (RI).

Referring to FIG. 2, a first DRM Agent may consume an RO issued from an RI by a certain amount, and then transfer (move) the RO to a second DRM Agent via the RI. The first DRM Agent requests the RI to move the RO to the second DRM Agent, and transfers the RO to the RI (or deletes the RO). The RI responds to the request, and transfers the RO to the second DRM Agent by using an RO Acquisition protocol with the second DRM Agent.

FIG. 3 is a schematic block diagram showing a state that an RO and a DRM content that can be user by a DRM Agent is imported to the DRM Agent via a Local Rights Manager (LRM).

Referring to FIG. 3, a DRM content and an RO (or license) that have been protected by an external DRM System, may be imported (changed) that can be used by a DRM Agent, via a Local Rights Manager (LRM). The reason is because a DRM content and an RO having been received from an external DRM system can not be used at a DRM system having a different standard. Accordingly, a DRM content having been received from a DRM system having a different standard is imported to the LRM. The Imported RO may be transferred to a DRM Agent from the LRM. However, there is a technical limitation in that the DRM Agent can not transfer the Imported RO to another DRM Agent.

SUMMARY OF THE INVENTION

Therefore, it is an object of the present invention to provide a method for moving a Rights Object (RO or license) imported by a Local Rights Manager (LRM) to a second DRM Agent from a first DRM Agent, and a method for managing rights of issuing RO.

To achieve these objects, there is provided a method for moving Rights Object (RO), comprising: sending, by a First Entity, a Registration Request Message including first information about moving of an RO, to a Second Entity; receiving, by the First Entity, a Registration Response Message including second information about moving of an RO, from the Second Entity; importing, by the First Entity, an RO and a DRM content from digital contents received from an external system; and moving, by the First Entity, the Imported RO to a DRM Agent.

The method further comprises receiving, by the First Entity, a Trigger Message for a protocol to be registered to the Second Entity, from the Second Entity.

To achieve these objects, there is also provided a method for managing rights of issuing Rights Object (RO), comprising: receiving, by a Second Entity, a Request Message about moving of an RO created by a First Entity, from the First Entity; checking, by the Second Entity, whether first information about moving of an RO has been included in the Request Message; and when the Second Entity permits moving of an RO, sending, by the Second Entity, a Response Message including second information about moving of an RO, to the First Entity.

Preferably, the method further comprises: checking, by the Second Entity, whether a RequestToMoveRO parameter has been included in the Request Message; and storing, by the Second Entity, an ID of the First Entity.

Preferably, the method further comprises: receiving, by the Second Entity, from a first DRM Agent a Request Message about moving of an RO to a second DRM Agent; extracting, by the Second Entity, an ID of the First Entity included in the Request Message; checking, by the Second Entity, whether the stored ID of the First Entity is consistent with the extracted ID of the First Entity; when the two IDs of the First Entity are consistent to each other, sending, by the Second Entity, the Response Message, to the first DRM Agent; and moving, by the Second Entity, the RO to the second DRM Agent.

To achieve these objects, there is still also provided a method for moving an imported Rights Object (RO), comprising: receiving, by a first DRM Agent, an RO from a Local Rights Manager (LRM), wherein the RO is obtained from contents imported by the LRM from an external system; sending, by the first DRM Agent, an RO Moving Request Message, to an Rights Issuer (RI) so as to move the RO to the second DRM Agent; and receiving, by the first DRM Agent, a Response Message about the RO Moving Request Message, from the RI.

The present invention has the following effects.

Firstly, since a new protocol and information for moving an RO (element or parameter) are defined between the RI and the LRM, an RO created by the LRM can be safely moved between the first and second DRM Agents.

Secondly, through the new protocol and information for moving an RO (element or parameter), rights of issuing an RO imported by the LRM can be effectively managed.

Thirdly, since the DRM Agent can move not only an RO issued from the RI, but also an RO imported from an external DRM system, to other DRM Agent, a user's convenience in using digital contents can be enhanced.

According to an embodiment, the present invention provides a method for managing rights, comprising receiving, by a rights issuing server, from a server a registration request message, wherein the registration request message includes a first element indicating a required service for moving a rights object, which is generated by the server, between a first terminal and a second terminal via the rights issuing server; transmitting, by the rights issuing server, to the server a response message including a second element indicating the rights issuing server will provide a move service for the rights object generated by the server; receiving, by the rights issuing server, from the first terminal a request message for moving the rights object from the first terminal to the second terminal; checking, by the rights issuing server, whether or not a signer of a signature related to the rights object to be moved is the server, which has issued the rights objects by importing from other DRM, is registered for the move service; and providing, by the rights issuing server, a rights object to the second terminal based on the rights.

According to an embodiment, the present invention provides a method for moving rights, comprising acquiring, by a first terminal, a first rights object (RO) via a rights object acquisition protocol (ROAP) from a rights issuing server; acquiring, by the first terminal, a second RO from a server serving as local rights manager (LRM) via a protocol between the first terminal and the LRM server, wherein the second RO is generated by the LRM server converting a format of non-OMA DRM standard from an external system into a format of OMA DRM standard; checking, by the first terminal, whether the second RO is to be moved to a second terminal; checking, by the first terminal, whether the second RO is generated by the LRM server or by the rights issuing server; checking, by the first terminal, whether the rights issuing sever matches with an entity indicated as being eligible to provide a move service for the second RO within the second RO if the second RO is generated by the LRM server; and transmitting, by the first terminal, to the rights issuing server, a move RO request message for moving the second RO to the second terminal.

DESCRIPTION OF THE PREFERRED EMBODIMENTS

Figure 1:
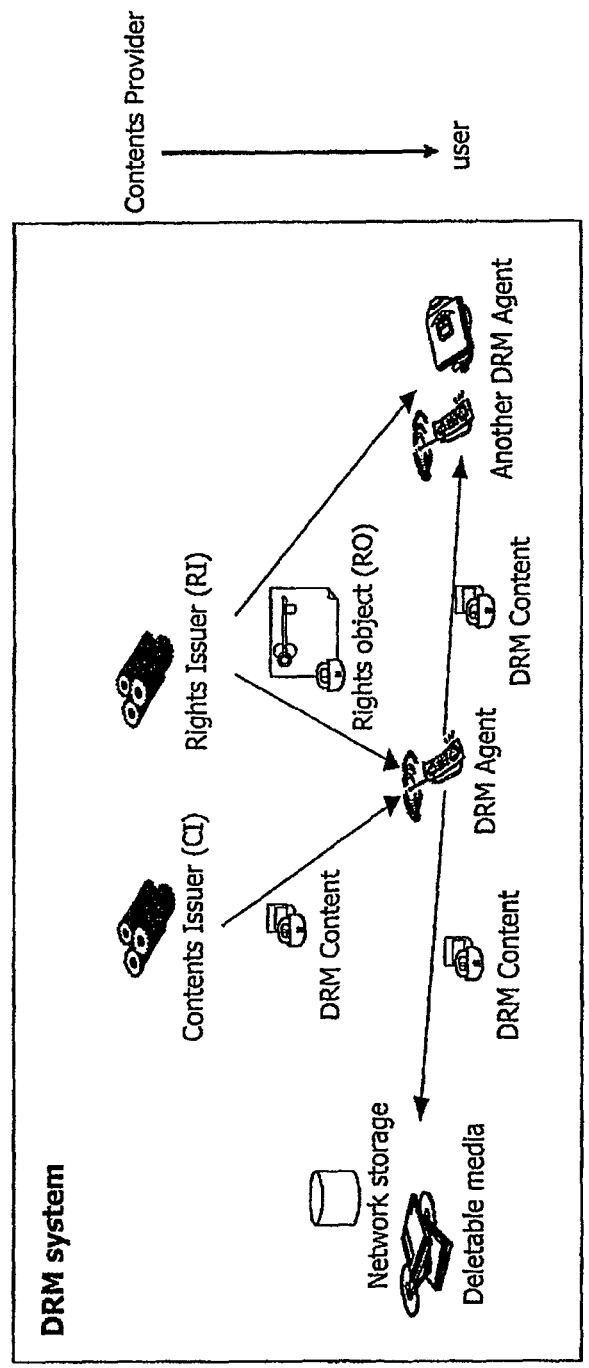
FIG. 1 is a configuration view showing a Digital Rights Management (DRM) system in accordance with the conventional art.
Figure 2:
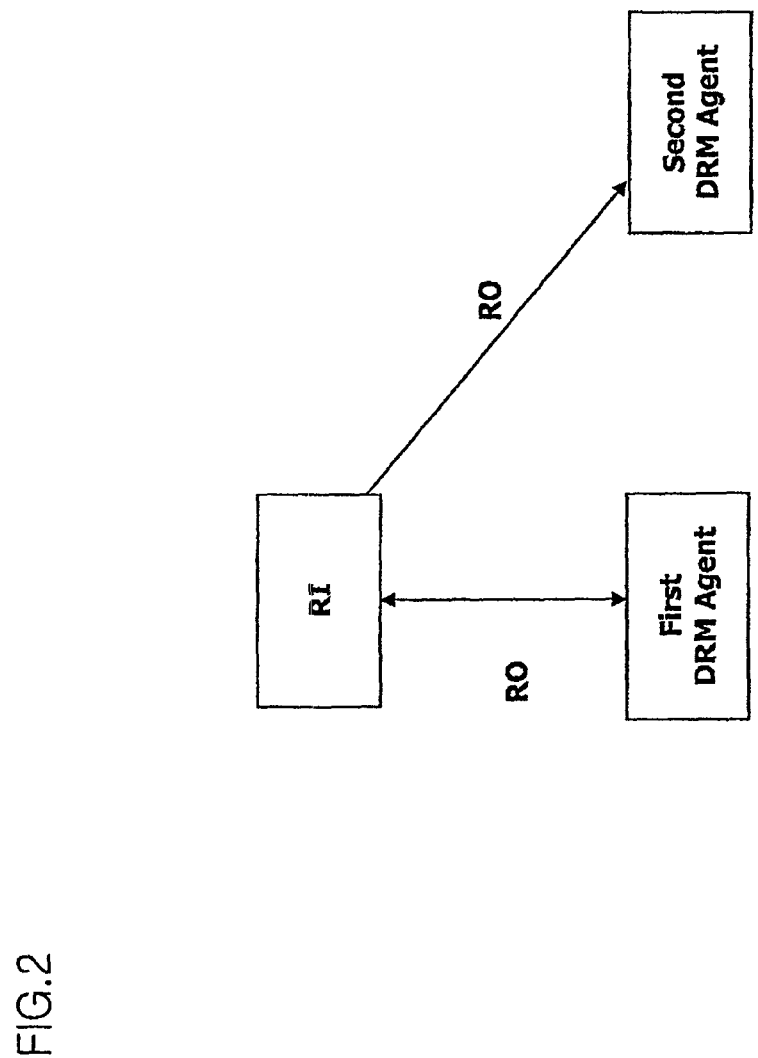
FIG. 2 is a block diagram showing a state that a Rights Object (RO) is moved between DRM Agents via a Right Issuer (RI)
Figure 3:
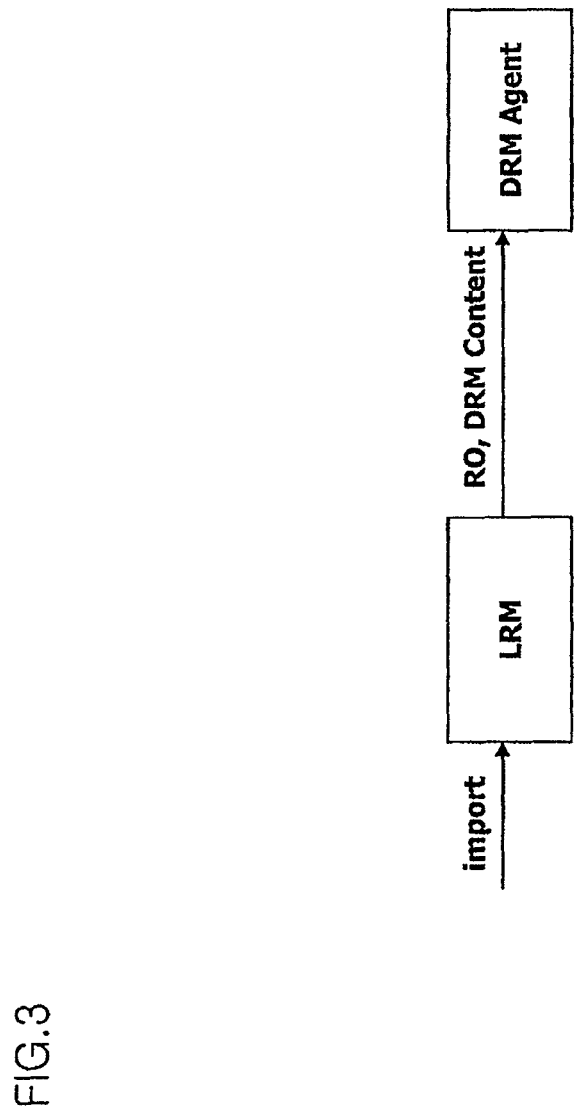
FIG. 3 is a schematic block diagram showing a state that an RO and a DRM content that can be user by a DRM Agent are imported to the DRM Agent via a Local Rights Manager (LRM)

Reference will now be made in detail to the preferred embodiments of the present invention, examples of which are illustrated in the accompanying drawings.

The present invention is applied to a Digital Rights Management (DRM) system. However, the present invention is not limited to the DRM system, but may also be applied to all communications systems and methods thereof to which the technical scope of the present invention may be applied, and other copyrights related system and method thereof.

Various modifications and embodiments can be made in the present invention, and reference will be made in detail to the preferred embodiments of the present invention, examples of which are illustrated in the accompanying drawings. However, it should also be understood that embodiments are not limited by any of the details of the foregoing description, but rather should be construed broadly within its spirit and scope and it is intended that the present invention cover modifications and variations of this invention provided they come within the scope of the appended claims and their equivalents.

Though terms including ordinal numbers such as a first, a second, etc. may be used to explain various components, the components are not limited to the terms. The terms are used only for the purpose of distinguishing one component from another component. For instance, a first component may be referred to as a second component, or similarly, the second component may be referred to as the first component, without departing from the scope of the present invention. A term 'and/or' is used to include a combination of a plurality of disclosed items or one of the items.

In case it is mentioned that a certain component is "connected" or "accessed" to another component, it may be understood that the certain component is directly connected or accessed to the another component or that a component is interposed between the components. On the contrary, in case it is mentioned that a certain component is "directly connected" or "directly accessed" to another component, it should be understood that there is no component therebetween.

Terms used in the present invention is to merely explain specific embodiments, thus it is not meant to be limiting. A singular expression includes a plural expression except that two expressions are contextually different from each other. In the present invention, a term "include" or "have" is intended to indicate that characteristics, figures, steps, operations, components, elements disclosed on the specification or combinations thereof exist. Rather, the term "include" or "have" should be understood so as not to pre-exclude existence of one or more other characteristics, figures, steps, operations, components, elements or combinations thereof or additional possibility.

Except that they are not differently defined, all terms used in the present invention including technical or scientific terms have the same meanings with terms that are generally understood by those skilled in the art related to the field of the present invention. The terms same as those of which are defined in a general dictionary should be understood that the terms have meanings same as contextual meanings of the related art. And, as long as the terms are not definitely defined in the present invention, the terms are not interpreted as ideal or excessively formal meanings.

Reference will now be given in detail to the preferred embodiments of the present invention, examples of which are illustrated in the accompanying drawings. Wherever possible, the same reference numerals will be used through the drawings to refer to the same or similar parts, and the same descriptions thereof are omitted.

The basic concept of the present invention is that an RO created (imported) by a Local Rights Manager (LRM) is transferred (moved) to a specific DRM Agent (for convenience, a first DRM Agent), and then the Imported RO is transferred (moved) to another DRM Agent (for convenience, a second DRM Agent) via a Rights Issuer (RI). For this, (1) a new protocol (LRM_RI Registration Protocol) between the LRM and the RI is defined, (2) newly added defined information (e.g., parameter) is used when the LRM imports an RO, (3) when receiving a request of moving the RO from the first DRM Agent, and when performing the LRM_RI Registration Protocol, the RI moves the RC) to the second DRM Agent based on stored information.

In the present invention, a new protocol (LRM_RI Registration Protocol) is defined between the LRM and the RI, and new information (parameter), a RequestToMoveRO, an OkayToMoveRO, etc. are defined. The new protocol and the parameter will be explained in more detail.

Hereinafter, the terms used in the present invention will be explained.

LRM is an entity that is responsible for aspect(s) of Import and it may also manage an Imported-Content for a limited group of OMA DRM Agents. Also, the LRM is an entity that manages an imported content (e.g., DRM content) for a specific group to which DRM Agents belong. Here, the 'Import' has a meaning of converting Import-Ready Data into OMA (P)DCFs and ROs.

Certificate Authority (CA) is an entity that performs functions relating to certification of entities, contents, etc.

The ROs for DRM contents are divided into a Stateful RO and a Stateless RO. The Stateless RO is an RO that a DRM Agent does not manage State Information. The Stateful RO is an RO that a DRM Agent manages State Information so as to precisely utilize a Permission and a Constraint inside the RO. The Constraint managed by the State Information includes 'interval', 'count', 'timed-count', 'accumulated', etc. The State Information indicates a usable amount of RO, and one State Information is managed by one Stateful RO. The State Information may be managed in a manner of 'count', 'timed-count', etc., or in a manner of 'remaining count', 'remaining interval', etc. State Information may be a set of values representing a current sate associated with Rights. It is managed by the DRM Agent only when the Rights contain any of the Stateful Constraints (e.g., interval, count, timed-count, accumulated, etc.).

The DRM Agent (or device) indicates all types of devices that can perform technical features of the present invention. That is, the DRM Agent of the present invention receives an RO (RO imported by the LRM), and moves the Imported RO to another DRM Agent via the RI. The DRM Agent includes all types of mobile communication terminals (e.g., User Equipment(UE), portable terminal, mobile phone, DMB phone, game phone, camera phone, smart phone, etc.), a notebook, a desktop computer, Personal Digital Assistants (PDA), so-called white home appliances, etc. These devices receive an RO imported by an LRM, transmit the Imported RO to another DRM Agent via an RI, and receive the RO from the RI.

The DRM Agent of the present invention may be configured as one component of a device as a module that performs functions relating to management of digital contents, e.g., software and hardware devices. Hereinafter, the terms of 'DRM Agent' and 'Device' will be considered to have the same meaning.

Hereinafter, preferred embodiments of the present invention will be explained in more detail with reference to the attached drawings. The same reference numerals will be given to the same parts or corresponding parts, and their detailed explanations will be omitted.

Figure 4:
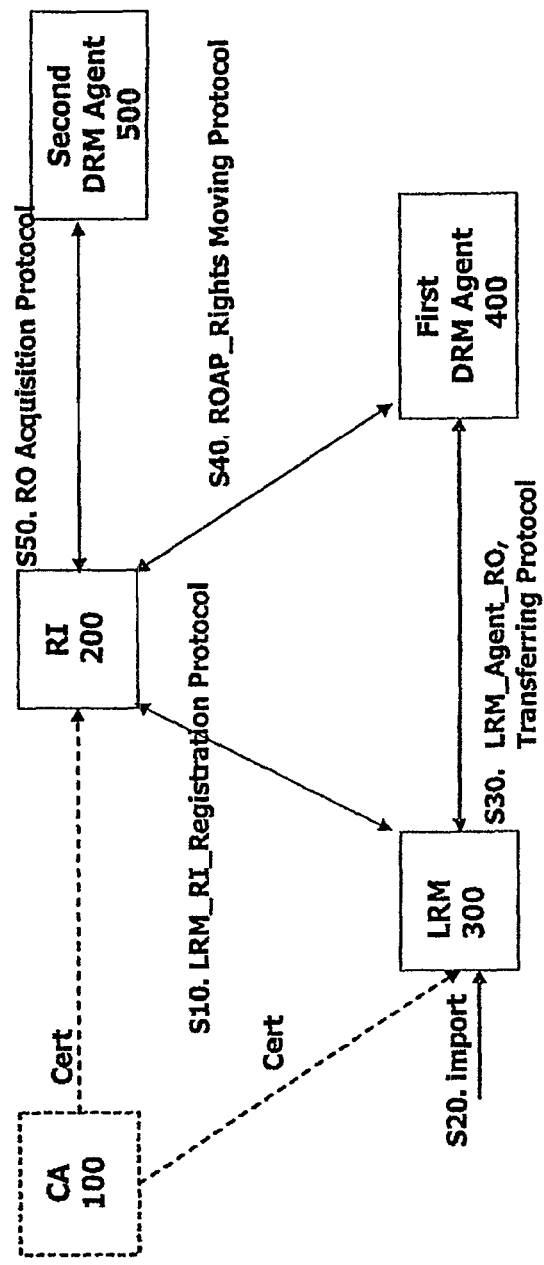
FIG. 4 is a block diagram showing a method for moving an Imported RO according to a first embodiment of the present invention.

FIG. 4 is a block diagram showing a method for moving an Imported RO according to a first embodiment of the present invention.

As shown in FIG. 4, the system comprises a Certificate Authority (CA) 100, a Rights Issuer (RI) 200, a Local Rights Manager (LRM) 300, a first DRM Agent 400 (or first device), and a second DRM Agent 500. The CA 100 provides a certificate to the RI 200, the LRM 300, the first DRM 400, and the second DRM 500. Here, the certificate of the CA serves as a common root certificate. For instance, processes to issue a certificate by the CA 100 are based on a well-known X.509 based-process, and its detailed explanation will be omitted.

Referring to FIG. 4, a newly defined protocol between the RI 200 and the LRM 300 (e.g., LRM_RI Registration Protocol) serves as a signaling between the RI 200 and the LRM 300 so that an RO created by the LRM 300 can be moved, by the first DRM Agent 400, to the second DRM Agent 500 via the RI 200 (S10).

Then, the LRM 300 imports the RO received by the LRM 300 from an external system (or DRM Agent) (S20). Here, the Imported RO is an RO created and issued by the LRM 300 by matching an RO of another standard format with a standard format of the present invention. The Imported RO is defined so as to be distinguished from the RO received by the LRM 300 from an external system.

The LRM 300 moves an Imported RO to the first DRM Agent 400 through an LRM_Agent_RO Moving Protocol (S30). Once the first DRM Agent 400 requests the RI 200 of moving the Imported RO to the second DRM Agent 500, by performing an ROAP_RO Moving Protocol (S40), the Imported RO is moved to the second DRM Agent 500 from the RI 200 (S50).

Figure 5:
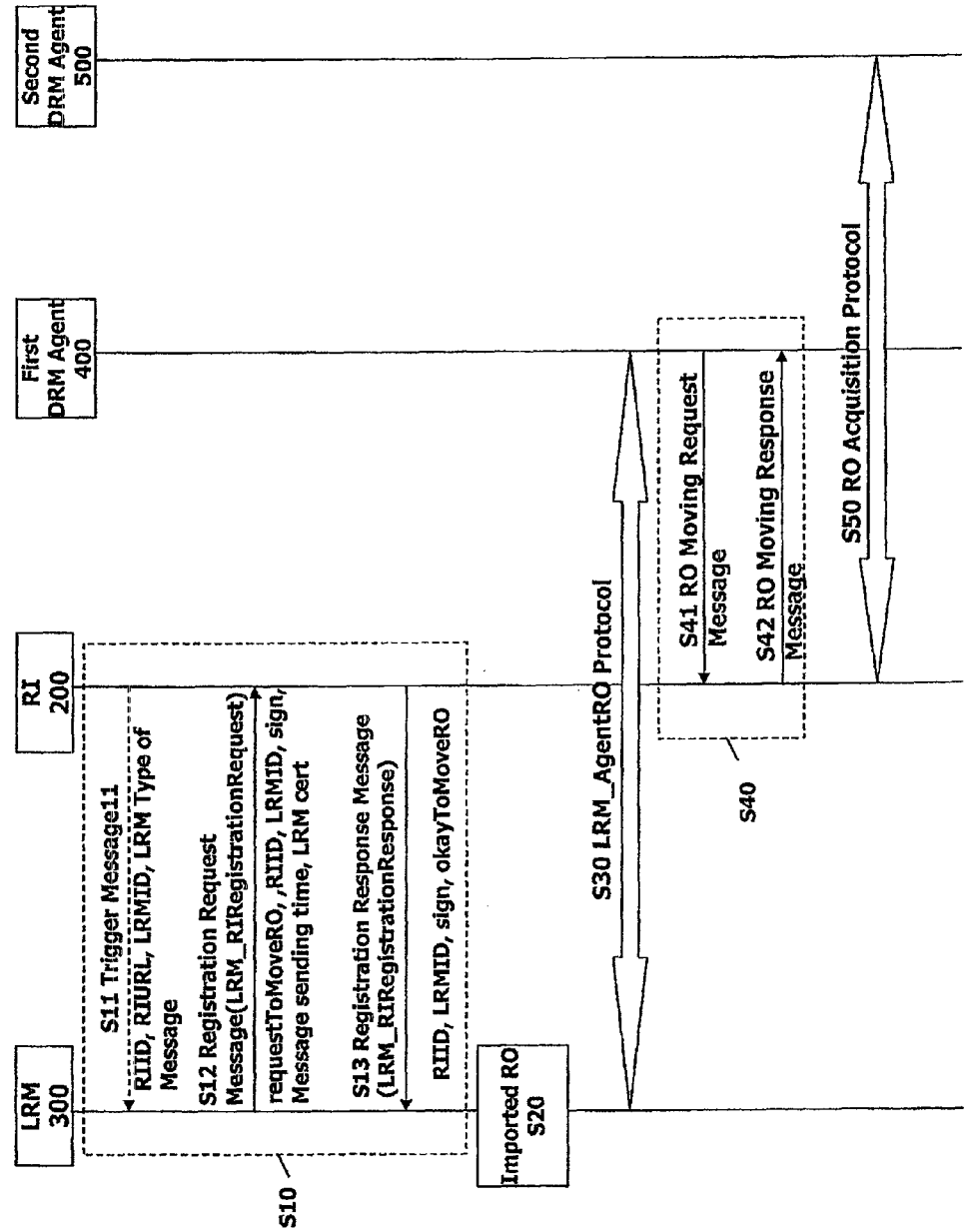
FIG. 5 is a flowchart showing a method for moving an Imported RO according to a first embodiment of the present invention.

FIG. 5 is a flowchart showing a method for moving an Imported RO according to a first embodiment of the present invention, which explained FIG. 4 in more detail.

FIG. 5 shows a method for requesting, by the RI 200, an Imported RO (RO created from the LRM 300) from the first DRM Agent, and then moving to the second DRM Agent. The method comprises: registering, by the LRM 300, to the RI 200 through an LRM_RI_Registration Protocol (S10); importing, by the LRM 300, an RO received (or acquired) from another DRM system (S20); moving, by the LRM 300, the Imported RO, to the first DRM Agent 400 through an LRM_Agent RO Protocol (S30); moving, by the first DRM Agent 400, the Imported RO and State Information, to the RI 200 through a ROAP_RO Moving Protocol (S40); and issuing the RO by using an RO Acquisition Protocol (e.g., the conventional 1-pass or 2-pass RO Acquisition Protocol, or 3-pass Confirmed RO Acquisition Protocol). These steps S10 to S50 will be explained in more detail.

The LRM 300 requests the RI 200 of registering, through an LRM_RI_Registration Protocol (S10).

Here, specific information (or parameter or element) is exchanged between the LRM 300 and the RI 200, so that an Imported RO (RO to be created by the LRM 300 in step S20) can be moved between the DRM Agents via the RI 200.

The LRM_RI_Registration Protocol of step S10 will be explained in more detail.

The RI 200 may send a Trigger Message to the LRM 300 by using a technique such as WAP Push (S11). The Trigger Message includes at least one of an RI ID, an RI URL, an LRM ID, and the kind of a message to be sent by the LRM.

The kind of a message to be sent by the LRM is a Registration Request Message (corresponding to step S12). The Trigger Message in step S11 corresponds to an option. That is, the subsequent steps (S12 and S13) may be executed without the step S11.

The LRM 300 receives the Trigger Message, then, accesses the RI 200 by using a URL of the RI included in the Trigger Message, and sends a Registration Request Message (LRM_RIRegistrationRequest in FIG. 5) (S12). Here, the LRM 300 may send the Registration Request Message by obtaining its user's (e.g., the first DRM Agent's user's) consent, e.g., by displaying, on a display of the DRM Agent, whether to agree or not. However, without the step S11, the LRM 300 may send the Registration Request Message by accessing the RI 200 (S12). Here, the LRM 300 may send the Registration Request Message to the RI 200 by using a predefined (e.g., preset at the time of being shipped from factory) URL of the RI 200. The Registration Request Message in step S12 includes at least one of an LRM ID, an RI ID, a message sending time (time when the Registration Request Message was transmitted), a signature for the entire Registration Request Message, etc. The Registration Request Message may further include a certificate of the LRM 300, and/or a 'RequestToMoveRO' parameter (or 'NeedMoveService' element. Here, the 'RequestToMoveRO' parameter corresponds to a request that an Imported RO (created by the LRM 300) be later moved via the RI 200. The 'NeedMoveService' element, if present, is used by the LRM to indicate to the RI that the LRM needs the RI provides Move service for the ROs created by the LRM, so that the ROs created by the LRM can be Moved via the RI to other Devices.

The RI 200 processes the Registration Request Message, and sends a Registration Response Message.

(LRM_RIRegistrationResponse in FIG. 5) to the LRM 300 (S13). A method for processing the Registration Request Message by the RI 200 in step S13 will be explained in more detail.

Firstly, the RI 200 checks a signature of the received Registration Request Message. If the Registration Request Message includes a certificate (LRM Cert) therein, the RI 200 checks that the LRM 300 has been certified by its trustful certificate Authority. Then, the RI 200 checks whether to revoke the LRM Cert or not, via a CRL or an OCSP provided from the Certificate Authority (not shown in FIG. 5). Then, the RI 200 checks whether a 'RequestToMoveRO' parameter is included in the Registration Request Message. According to whether or not a 'RequestToMoveRO' parameter is included in the Registration Request Message, the RI 200 can check whether an RO to be created (or having been created) by the LRM 300, i.e., an RO to be imported in step S20, can be later moved via the RI 200. The check is based on a contract between the LRM 300 and a manufacturing company, or a contract between the LRM 300 and a user, or policies of a Content Provider that operates the RI 200. When the RI 200 allows the LRM 300 to provide a service to move an RO ('MoveRO' service), the RI 200 stores an ID of the LRM 300 in a storage unit thereof. Here, the ID of the LRM 300 is used, when the first DRM Agent 400 requests the RI 200 of moving an RO to the second DRM Agent 500, so as to check whether the requested RO can be moved (S40 in FIG. 5).

Secondly, the RI 200 makes a Registration Response Message, and sends it to the LRM 300. Here, the Registration Response Message includes at least one of information (status information) indicating whether the Registration Request Message has succeeded or failed, an RI ID, an LRM ID, and a signature for an entire message. When the Registration Request Message received by the RI 200 has failed (e.g., when the RI 200 can not process the Registration Request Message, or a certification has failed, etc.), the Registration Response Message may further include failure reasons. The Registration Response Message may include an 'OkayToMoveRO' parameter (information or element). The 'OkayToMoveRO' parameter includes information indicating a result of a check for a 'RequestToMoveRO' parameter included in the Registration Request Message. That is, the 'OkayToMoveRO' (or 'ProvideMoveService') parameter is used by the RI to indicate to the LRM 300 whether the RI 200 will provide Move service for the ROs that the LRM 300 creates.

The 'OkayToMoveRO' parameter(element) may be used in various ways. If the 'OkayToMoveRO' element is present in rspinfo element in LRM-RIRegistrationResponse (i.e., Registration Response Message of S13), the LRM 300 may indicate within all the Imported-Rights-Objects that the LRM 300 creates that this particular RI 200 is eligible to move the RO. On the contrary, If the 'OkayToMoveRO' element is not present in rspinfo element in LRM-RI Registration Response (i.e., Registration Response Message of S13), the LRM 200 shall not indicate within any Imported-RO that the LRM 200 creates that this particular RI 200 is eligible to move the Rights. Alternatively, the 'OkayToMoveRO' parameter may include State Information into the Registration Response Message. Here, the State Information indicates whether an RO created by the LRM 300 (Imported RO) can be moved between the DRM Agents. For instance, when the Status Information is set as 'success', it indicates that the 'OkayToMoveRO' parameter is included in the Registration Response Message. On the contrary, when the Status Information is set as 'failure', it indicates that the 'OkayToMoveRO' parameter is not included in the Registration Response Message. The RI 200 makes a Registration Response Message including information for an LRM_RI Registration Protocol with the LRM 300, and sends it to the LRM 300.

The Trigger Message in S11 may correspond to an option. When sending the Registration Request Message without the Trigger Message, the LRM 300 may send the Registration Request Message to the RI 200 by using a predefined (e.g., preset at the time of being shipped from the factory) URL of the RI 200.

Hereinafter, the steps S20 and S30 will be explained in more detail.

Firstly, the LRM 300 imports a content from another DRM system (S20). As a result, an Imported RO and a DRM content are created. If the LRM 300 is permitted, by the RI 200, to move the created RO via the RI 200, information for later moving an RO via the RI 200 ('RO moving information') is included in the RO (RO created by the LRM). Here, the 'RO moving information' includes at least one of an RI ID, an RI URL, and an LRM ID. The LRM 300 calculates a signature of the RO, and inserts it into the RO. That is, the RO (Imported RO) includes 'RO moving information' indicating that the RO can be moved to another DRM Agent (e.g., second DRM Agent) via the RI 200, a signature, an LRM ID, etc. The LRM ID is displayed inside the RO.

The LRM 300 moves the RO created in the step S20 (Imported RO) to the first DRM Agent through an LRM_Agent RO Protocol (S30).

Hereinafter, steps S40 and S50 will be explained.

If a user of the first DRM Agent 400 is to move an RO created by the LRM 300 in step S20 (Imported RO) to the second DRM Agent 500, the first DRM Agent 400 sends the Imported RO (RO received from the LRM 300) to the RI 200 by using a ROAP_Rights Moving Protocol with the RI 200

(S40). Here, when the RO is a Stateful RO, State Information of the RO may be additionally sent.

More concretely, the first DRAM Agent 400 sends an 'RO Moving Request Message' to the RI 200 (S41). Here, the 'RO Moving Request Message' is 'RO moving information', and includes at least one of an ID of the first DRM Agent 400, an ID of the RI 200, a message sending time (time when the 'RO Moving Request Message' was transmitted), and an RO signed by the LRM (Imported RO received from the LRM). If the RO is a Stateful RO, State Information of the RO is further included in the 'RO Moving Request Message'. The RO Moving Request Message may further include an MAC or a signature.

The RI 200 processes the RO Moving Request Message in step S41. More concretely, the RI 200 checks a signature of the RO received from the LRM 300, that is, checks whether the LRM 300 that signed the RO has been permitted, by the RI 200 through an LRM_RI_Registration Protocol (S10), to move the RO. Here, the check by the RI 200 is performed by using an LRM ID inside the RO. That is, the RI 200 compares an LRM ID stored when processing the Registration Request Message of S12, with an LRM ID inside the RO of S41. If the two LRM IDs are consistent to each other, the RI 200 determines that moving the RO is permitted.

The RI 200 creates an RO Moving Response Message, and sends it to the first DRM Agent 400 (S42). Here, the RO Moving Response Message includes at least one specific information, such as information indicating whether moving the RO of S41 has succeeded or failed, an ID of the RI 200, and an ID of the first DRAM Agent 400. Here, the information indicating whether moving the RO of S41 has succeeded or failed, is information indicating whether moving the RO is permitted as a result of comparing the two LRM IDs with each other. For instance, if the LRM IDs are consistent to each other (a successful check result), the information indicating whether moving the RO has succeeded or failed is set to include information indicating that moving the RO is permitted (Status=Success). On the contrary, if the LRM IDs are not consistent to each other (an unsuccessful check result), the information indicating whether moving the RO has succeeded or failed is set to include information indicating that moving the RO is not permitted (Status=Failure), or information indicating that an error is included in the RO Moving Request Message. The RO Response Message may further include an MAC (MAC with respect to the entire RO Response Message) and/or a signature.

The first DRM Agent 400 receives the RO Moving Response Message from the RI 200, and checks whether an MAC or a signature is included in the received RO Moving Response Message (S42). If the RO Moving Response Message includes information indicating that moving the RO has failed, the first DRM Agent 400 may inform to its user through an output device (e.g., display or speaker, etc. of the first DRM Agent).

If the RO Moving Response Message includes information indicating that moving the RO has succeeded, the RI 200 issues an RO to the second DRM Agent 500 by using an RO Acquisition Protocol (S50). The RO Acquisition Protocol may be the conventional 1-pass or 2-pass RO Acquisition Protocol, or 3-pass Confirmed RO Acquisition Protocol. The RO Acquisition Protocol of the step S50 corresponds to the conventional art, so that its detailed explanation will be substituted by the 'OMA DRM 2.1 DRM Specification'.

Hereinafter, configurations and functions of the LRM 300 according to the present invention will be explained.

The LRM 300 may create an RO imported from a content having been received by itself from an external system, so as to be movable between DRM Agents. For this, the LRM 300 requests the RI 200 of moving an RO by using an LRM_RI Registration Protocol, and receives a response from the RI 200. Here, the LRM 300 may request the RI 200 of moving an RO by including a 'RequestToMoveRO' parameter in the Registration Request Message, so that an Imported RC) can be movable between DRM Agents via the RI 200 (refer to S12 in FIG. 5). Then, the LRM 300 may check whether an 'Okay-ToMoveRO' parameter (status information) is included in the Registration Response Message, and check whether the RI 200 has permitted the RO imported by the LRM 300 to be moveable between DRM Agents (refer to S12 in FIG. 5). If the RI has permitted the RO to be moveable, the LRM 300 creates an RO from a content received from an external system, by including its ID (LRM ID) in the RO. The operation and functions of the LRM may be executed by a processor (or controller) of the LRM 300.

Here, the processor of the LRM 300 may be implemented by software, or hardware, or a module having a software, etc. Explanations for the operation of the LRM 300 will be substituted by those aforementioned in FIGS. 4 and 5.

Hereinafter, the configurations and functions of the RI 200 of the present invention will be explained.

The RI 200 may manage rights of issuing RO imported by the LRM 300. That is, when the LRM 300 requests a moving of an RO, the RI, 200 may permit or reject a moving of an RO with consideration of system conditions and user's policies (refer to S10 in FIG. 5). That is, the RI 200 may check a 'RequestToMoveRO' parameter included in the Registration Request Message sent from the LRM 300, and permit the request about moving an RO between DRM Agents via the RI 200, by including an 'OkayToMoveRO' parameter in a Registration Response Message. The RI 200 stores an LRM ID in a storage unit thereof. Then, when receiving, from the first DRM Agent, a request about moving an RO (imported by the LRM) to the second DRM Agent, the RI 200 extracts an LRM ID from the RO. Then, the RI 200 compares the extracted LRM ID with the LRM ID stored therein. If the two LRM IDs are consistent to each other, it is determined that the RI 200 has permitted the LRM 300 to move the RO. Accordingly, the RI 200 moves the RO to the second DRM Agent requested by the first DRM Agent. The operation and functions of the RI 200 may be executed by a processor (or controller) of the RI 200. Here, the processor of the RI 200 may be implemented by software, or hardware, or a module having a software, etc. Explanations for the operation of the RI 200 will be substituted by those aforementioned in FIGS. 4 and 5.

It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:
1. A method for moving rights, comprising:
sending, by a Local Rights Manager (LRM) server to a rights issuing (RI) server, a first message for requesting a move service for moving an imported rights object (RO) created by the LRM server between a first terminal and a second terminal via the RI server;
receiving, by the LRM server from the RI server, a second message indicating whether or not the RI server provides the move service for the imported RO created by the LRM server;

adding, by the LRM server, an indicator into the imported RO created by the LRM server if the RI server provides the move service,
wherein the indicator indicates that the RI server is able to move rights for the imported RO created by the LRM server; and
providing, by the LRM server, the imported RO including the indicator to the first terminal.

2. The method of claim 1, further comprising:
receiving, by the LRM server, a trigger message from the RI server.

3. The method of claim 2, wherein the trigger message includes at least one of an ID of the RI server, a URL of the RI server, an ID of the LRM server, and information indicating a kind of a message from the LRM server.

4. The method of claim 1, wherein the imported RO comprises at least one of information about the LRM server and information about the RI server,
wherein the information about the LRM server includes at least one of an ID of the LRM server and an address of the LRM server, and
wherein the information about the RI server includes at least one of an ID of the RI server and an address of the RI server.

5. The method of claim 1, wherein the first message includes at least one of an ID of the RI server, an ID of the LRM server, a signature, information about a time when the first message is transmitted, and a certification, and
wherein the second message includes at least one of an ID of the RI server, an ID of the LRM server, a signature, information about a time when the second message is transmitted, and a certification.

6. The method of claim 1, wherein the first message includes a 'need Move Service' element.

7. The method of claim 1, wherein the imported RO is created by importing digital contents from an external system.

8. The method of claim 1, wherein the second message includes a 'provide Move Service' element.

9. The method of claim 1, wherein the indicator is added into all rights objects that are imported by the LRM server if the second message indicates that the RI server provides the move service.

10. The method of claim 9, further comprising: checking step checking, by the LRM server, whether the second message indicates that the RI server provides the move service.

11. The method of claim 1, wherein the imported RO is created by generating at least one of a rights object or a DRM content and converting content or an associated rights object derived from non-OMA DRM source data into a format of OMA DRM source data.

12. A server, comprising:
a processor configured to:
send, to a rights issuing (RI) entity, a first message for requesting a move service for moving an imported rights object (RO) created by the server between a first terminal and a second terminal via the RI entity,
receive, from the RI entity, a second message indicating whether or not the RI entity provides the move service for the imported RO created by the server,
add an indicator into the imported RO created by the server if the RI entity provides the move service,
wherein the indicator indicates that the RI entity is able to move rights for the imported RO created by the server, and
provide the imported RO including the indicator to the first terminal.

13. The server of claim 12, wherein the processor is further configured to receive a trigger message from the RI entity.

14. The server of claim 12, wherein the imported RO comprises information associated with the server and information associated with the RI entity,
wherein the information associated with the server includes at least one of an ID of the server and an address of the server, and
wherein the information associated with the RI entity includes at least one or more of an ID of the RI entity and an address of the RI entity.

15. The server of claim 12, wherein the first message includes at least one of an ID of the RI entity, an ID of the server, a signature, information about a time when the first message is transmitted, and a certification, and
wherein the second message includes at least one of an ID of the RI entity, an ID of the server, a signature, information about a time when the second message is transmitted, and a certification.

16. The server of claim 12, wherein the first message includes a 'need Move Service' parameter.

17. The server of claim 12, wherein the imported RO is created by importing digital contents from the external system.

18. The server of claim 12, wherein the second message includes a 'provide Move Service' element.

19. The server of claim 12, wherein the indicator is added into all rights objects that are imported by the server if the second message indicates that the RI server provides the move service.

20. The server of claim 12, wherein the imported RO is created by generating at least one of a rights object or a DRM content and converting content or an associated rights derived from non-OMA DRM source data into a format of OMA DRM source data.

21. The server of claim 12, wherein the processor is further configured to check whether the second message indicates that the RI server provides the move service.

* * * * *